Figure 1:
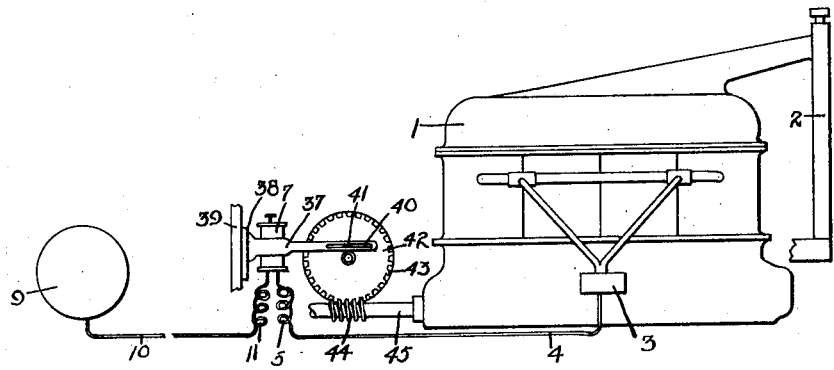

April 30, 1929.  C. H. BRASELTON ET AL  1,711,169
INERTIA PUMPING SYSTEM
Original Filed Feb. 1, 1922

Patented Apr. 30, 1929.

1,711,169

UNITED STATES PATENT OFFICE.

CHESTER H. BRASELTON, OF NEW YORK, AND FRED B. MacLAREN, OF MALBA, NEW YORK; SAID MacLAREN ASSIGNOR TO SAID BRASELTON.

INERTIA PUMPING SYSTEM.

Application filed February 1, 1922, Serial No. 533,491. Renewed August 7, 1924.

This invention relates to vibration pumps and means for positively causing the vibration of the same so that an inertia element inside the same may act to pump liquid from one source of supply to another vessel.

In the embodiment of the invention shown in the drawings which accompany and form a part of this specification various features of design and construction will appear novel in this art.

In the drawings Figure 1 illustrates an engine with our supply system for fuel applied thereto.

Figure 2:
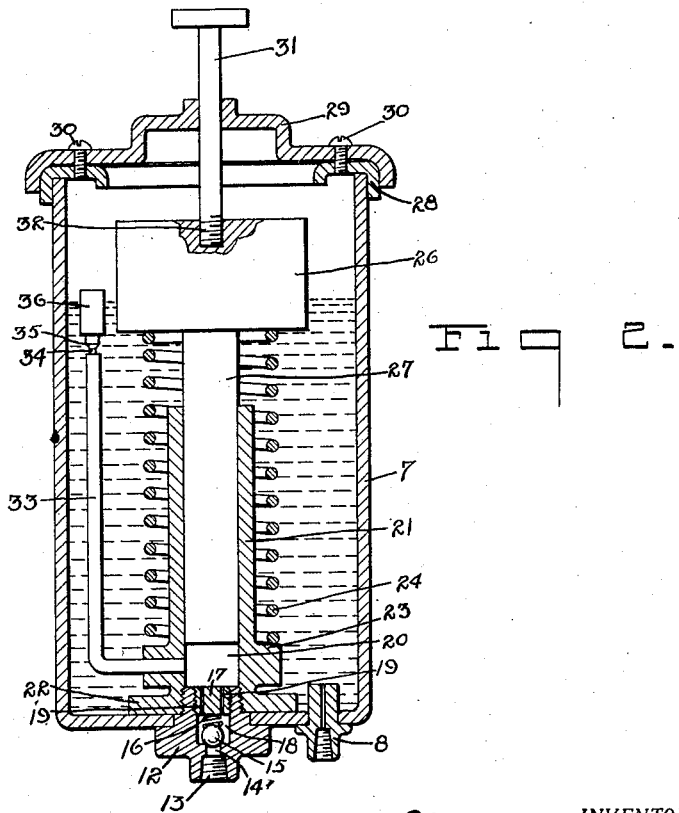

Figure 2 shows a longitudinal section of the pump mechanism shown in Figure 1.

In the drawings 1 indicates the engine having a usual radiator 2 and carburetor 3 for supplying fuel to the engine. The carburetor is fed by supply pipe 4 coiled at 5 and at its upper end secured to the bottom of pump 7 by connections 8. A main supply tank 9 is shown at a lower level than the pump tank and this is connected by feed pipe 10 coiled at 11 to the central part of the bottom of the pump tank by connection 12 threaded at 13 for connection to the pipe. The nut 12 is provided with an aperture 14 in the upper end of which fits a valve 15 pressed by spring 16 against a seat. The upper end of the spring 16 bears upon the lower end of nut 17 screw threaded in the upper part of recess 18 for the valve. Openings 19 extend longitudinally through the nut 17 to afford communication between the pump space 20 and the valve recess.

A pump cylinder 21 having a flange 22 rests upon the bottom of the inside of tank 7 and is held firmly in place by a threaded connection with the upper part of the nut 12 the latter serving to hold the cylinder, bottom of casing and the nut all together. The cylinder 21 has an enlarged portion 23 against the upper surface of which a spring 24 bears at its lower end while its upper end bears against the under surface of enlarged portion 26 of a piston 27 working in a cylinder 21 in a loose manner. A ring 28 is firmly fastened around the top of casing 7 and a cap 29 is attached by screws 30 to the ring 28. An operating rod 31 works through an opening in the top of cap 29 and the lower end of this rod is threadedly attached at 32 to the top of the piston. The spring normally holds the piston at a point of balance so that it may vibrate in either direction when the casing is subjected to vertical vibration or any vibration having a vertical component. As the cylinder and piston reciprocate relative to each other the space 20 at the bottom of the piston of course will be enlarged and decreased depending upon the relative movement.

A pipe 33 is connected at its lower end through enlarged portion 23 of the cylinder with the interior of the pump casing 20. This pipe is open at its upper end and a guide stem 34 works in the upper end of the pipe so as to guide valve 35 carried by float 36. When the liquid is sufficiently high in the inside of tank 7 float 36 will be elevated and its valve 35 lifted from its seat in the end of pipe 33. When however the liquid in the tank 7 is sufficiently low as to not hold the float in elevated position the valve 35 will seat on the end of pipe 33 and close the pipe.

It is obvious therefore that if the casing 7 is vibrated up and down by any means that a pumping action will take place between the cylinder and piston. If the liquid is low in the receiving tank 7 liquid will be pumped from the rear tank through pipe 10 past valve 15 into pump chamber 20, out through pipe 33 past the valve 35 which will automatically open and flow into the inside of tank 7. If the liquid in the tank 7 is sufficiently high so that the float is elevated to lift valve 35 from its seat then the operation of the vibrating pump will be rendered ineffective for the movement of the piston with respect to the cylinder will only draw liquid in through pipe 33 and then force the same out through it with no resulting effect. The float valve 36 therefore serves to render the pumping ineffective depending on the height of the liquid in the tank 7 so far as pumping liquid from the tank 9 to the chamber in the tank 7 is concerned.

Any suitable means may be provided for positively vibrating the tank chamber 7. In Figure 1 we have shown the casing 7 carried by an arm 37 having a slide 38 working in a groove in a support 39. The end of arm 37 has a slot 40 in which works a pin 41 on the side of gear 42 having gear teeth 43 meshing with the worm 44 carried by shaft 45 rotated by the engine. This form of gearing serves to reduce the vibration of the casing 7 over what it would be if no reduction gearing were provided and to make a practical mechanism for positively vibrating the self contained pumping tank. When the engine is operated the pump will be operated as above described due to the vibration of the tank 7 mechanically effected.

Having described our invention what we claim is:

1. In a liquid pumping system, a liquid source, a pump comprising two vertically arranged elements namely a cylinder and a piston both of which are freely movable, yieldable means tending to hold said cylinder and piston in predetermined relation, mechanically driven means for positively producing reciprocations in one of said elements, the other element possessing relatively great inertia whereby relative reciprocating motion between said elements is set up causing liquid to be lifted from said source.

2. In a liquid pumping system, a liquid source, a vertically arranged pump cylinder, mechanically driven means for positively producing vertical reciprocations of said cylinder, a piston possessing relatively high inertia slidably mounted within said cylinder, yieldable means for holding said cylinder and piston in predetermined relation, a conduit connecting said tank and pump cylinder, a check valve therein, a liquid delivery conduit leading from said pump and provided with a check valve, whereby reciprocating motion between said piston and cylinder is set up causing liquid to be lifted from said source.

3. In a fuel feed system for internal combustion engines, a main tank, an auxiliary high level tank, a connection between said tanks provided with a check valve opening towards said auxiliary tank, a pump comprising cylinder and piston elements, means for yieldably supporting one of said elements at a given level, but permitting movement thereof to either side of said level, engine driven means for positively reciprocating the other element, said pump being interposed in said connection between the said check valve and auxiliary tank, whereby liquid is raised from the main tank to said auxiliary tank.

4. In a fuel feed system for internal combustion engines, a main tank, an auxiliary high level tank, a connection between said tanks provided with a check valve opening towards said auxiliary tank, a pump comprising cylinder and piston elements, means for yieldably supporting one of said elements at a given level, but permitting movement thereof to either side of said level, engine driven means for positively reciprocating the other element, said pump being interposed in said connection between the said check valve and said auxiliary tank, whereby liquid is raised from the main tank to the auxiliary tank, said apparatus being designed and proportioned to pump more fuel than is required by the engine during ordinary running conditions, and means for interrupting the flow of fuel from said main tank whenever the fuel in the auxiliary tank reaches a certain predetermined level.

5. In a fuel feed system for internal combustion engines, a main tank, a pump comprising two vertically arranged elements namely a cylinder and a piston, yieldable means tending to maintain said cylinder and piston normally in predetermined relation but permitting free movement of one of said elements in either direction from said predetermined position, an auxiliary tank rigidly connected with said cylinder, a conduit connecting said main tank to said auxiliary tank, a check valve in said conduit, mechanically driven means for positively producing reciprocations in one of said two elements, the other element possessing relatively high inertia, a fluid delivery passage between said pump and said auxiliary tank, whereby relative reciprocating motion between said two elements is set up thereby causing liquid to be lifted from said main tank to said auxiliary tank.

6. In a liquid pumping system the combination of a supply tank; a pump comprising a cylinder and piston; yieldable means tending to hold said cylinder and piston in a predetermined relationship; and mechanically driven means for positively producing reciprocations of said cylinder.

7. In a liquid pumping system the combination of a source of supply; a pump consisting of cooperating relatively movable elements including a cylinder and a piston; yieldable means tending to hold one of said elements in a predetermined position in relation to the other element but permitting free movement from said position; and mechanically driven means for positively producing reciprocation of one of said elements.

8. In pumping mechanism the combination of a casing; a cylinder within and fixed to said casing; a piston within the casing and freely movable in said cylinder; yieldable means tending to hold said cylinder and piston in a predetermined relationship; and mechanically operated mechanism for positively producing reciprocations of the cylinder.

In testimony whereof, we affix our signatures.

CHESTER H. BRASELTON.
FRED B. MacLAREN.

CERTIFICATE OF CORRECTION.

Patent No. 1,711,169.  Granted April 30, 1929, to

CHESTER H. BRASELTON ET AL.

It is hereby certified that error appears in the printed specification of the above numbered patent requiring correction as follows: Page 2, line 93, claim 6, after the word "relationship" insert the words "but permitting free axial movement of the piston"; and that the said Letters Patent should be read with this correction therein that the same may conform to the record of the case in the Patent Office.

Signed and sealed this 9th day of July, A. D. 1929.

(Seal)

M. J. Moore,
Acting Commissioner of Patents.